UNITED STATES PATENT OFFICE.

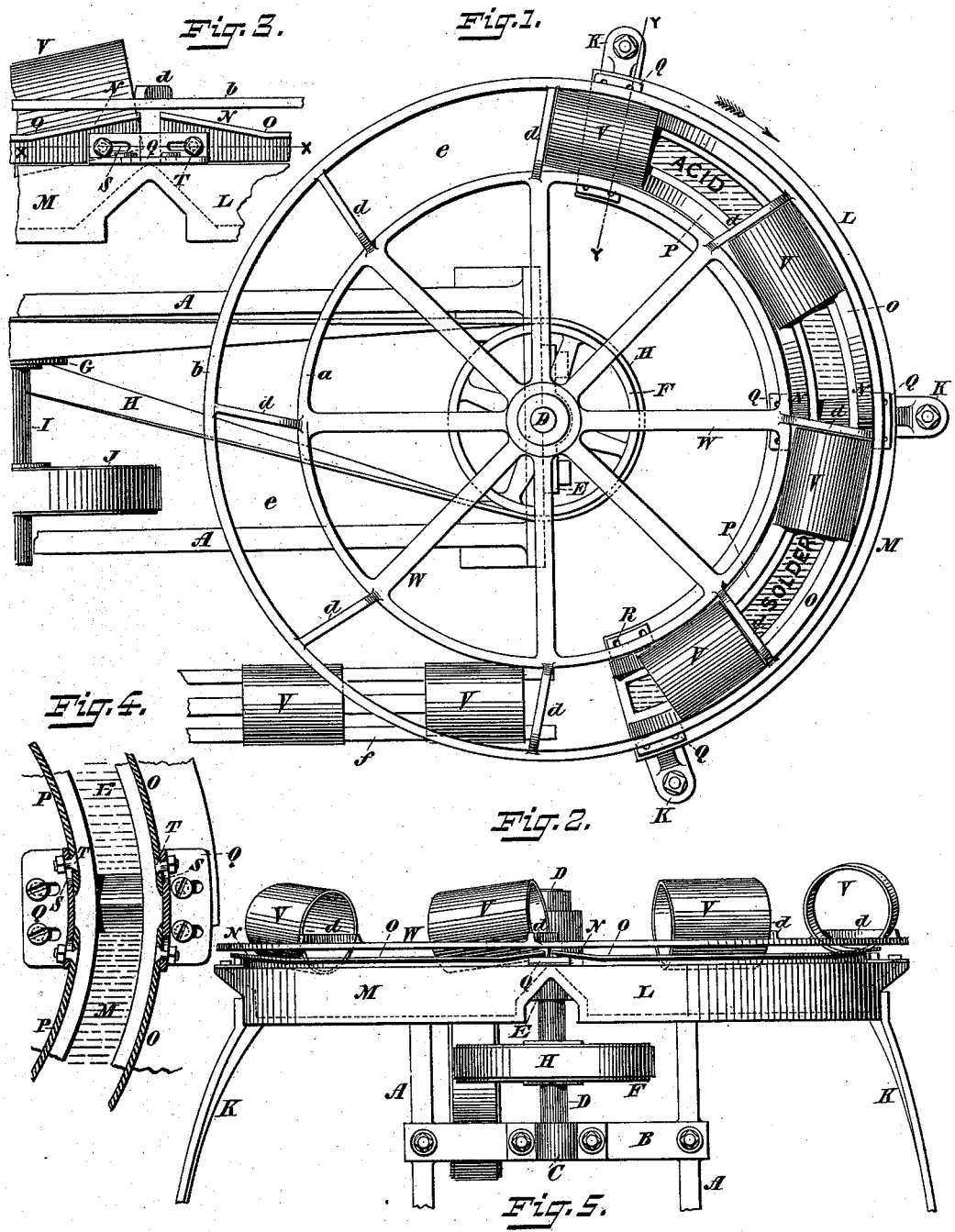

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR SOLDERING TIN CANS.

SPECIFICATION forming part of Letters Patent No. 401,887, dated April 23, 1889.

Application filed January 5, 1889. Serial No. 295,488. (No model.)

*To all whom it may concern:*

Be it known that I, WILLIAM HIPPERLING, a citizen of the United States, and a resident of New York, in the county of New York and State of New York, have invented certain new and useful Improvements in Machines for Soldering the Side Seams of Tin Cans, of which the following is a specification.

The invention relates to improvements in machines for soldering the side seams of can-bodies; and it consists in the elements of construction hereinafter described, and particularly pointed out in the claims.

The invention will be more fully understood from the detailed description hereinafter presented, reference being had to the accompanying drawings, in which—

Figure 1 is a top view of a machine embodying the elements of the invention. Fig. 2 is an end view of the same. Fig. 3 is a detached view of a portion of the end of the machine, illustrated on an enlarged scale. Fig. 4 is a top view of the same, partly in section on the dotted line X X of Fig. 3; and Fig. 5 is a vertical section on the dotted line Y Y of Fig. 1.

In the drawings, A A designate the sides or frame of the machine, between the front ends of which is secured the cross-bar B, having the journal-box C, in which the lower end of the vertical shaft D has a bearing, the upper end of said shaft being inclosed in the journal-box E. Upon the shaft D is applied the band-wheel F, which is connected with the band-wheel G by a belt, H, the wheel G being secured upon the driving-shaft I, carrying the wheel J, to which power may be applied for driving the machine.

In the front of the frame A A of the machine are secured upon legs K the acid and solder bath receptacles, (lettered L M, respectively,) said receptacles being in the arc of a circle and open at their upper portions, as indicated in Figs. 1 and 4, for the purpose of exposing the acid and solder to contact with the seams of the can-bodies while the latter are being moved along the upper edges of said receptacles. Upon the upper edges of the acid and solder receptacles L M are secured the segmental bars O P, respectively, said bars being secured by angle-plates Q, which are provided with elongated slots R, for the purpose of permitting their adjustment laterally toward or from each other in order to adapt the machine for can-bodies of different sizes. At the ends of the bars O P the angle-plates Q are provided with elongated slots S, to receive the bolts T, by which the bars O P are secured to said angle-plates, the purpose of the elongated slots S being to permit the adjustment of the bars O P toward or from each other without destroying their parallelism.

The can-bodies V are caused to move upon the bars O P, which serve as tramways, the seam of the can being downward and permitted to move through the acid and solder baths. The ends of the bars O P are provided with inclinations N, as illustrated in Figs. 2 and 3, the purpose of the inclinations being to cause the cans to tilt downward upon entering the acid bath and to tilt upward upon leaving the said bath, the surplus acid being thus allowed to run back into its receptacle, and then to cause the can-body to be tilted downward, as illustrated in Figs. 2 and 3, upon entering the solder bath, the inclination at the end of the latter bath causing the can-body to tilt upward again, in order that any surplus solder may run back into its bath prior to the can leaving the receptacle. Upon the upper end of the vertical shaft D is secured horizontally the wheel W, having at the ends of its spokes the rim $a$, which is connected with an outer rim, $b$, by connecting-bars $d$, the bars $d$ being equidistant from each other, and forming spaces $e$ in the wheel W to receive the can-bodies during their treatment by the machine. The rims $a\ b$ are located over the bars O P, as illustrated in Figs. 1 and 2, and form the sides of the spaces $e$, in which the cans are retained during their movement through the acid and solder baths.

In the operation of the machine power is applied to the band-wheel J, and through it, the shaft I, wheel G, and band H motion is communicated to the band-wheel F and vertical shaft D, which in rotating carries with it the wheel W, the latter thus having a continuous rotary motion over the acid and solder receptacles L M. The acid and solder being in the receptacles L M, and the wheel W being in motion, the can-bodies, one after another, are placed upon the outer end of the acid-receptacle, and are by the cross-bars *d* carried through the acid and solder baths, and finally delivered upon the frame *f*, from which they may be removed by hand or an endless chain. The can-bodies are moved through the acid and solder baths with their body-seam downward, the purpose being to effectually secure this seam in an air-tight manner.

I do not limit myself to any special mechanical means for imparting motion to the wheel W, since various well-known mechanical devices may be utilized to accomplish this result.

What I claim as my invention, and desire to secure by Letters Patent, is—

1. The acid and solder receptacles in the outline of the arc of a circle, and the bars O P, arranged upon said receptacles, to receive and operate as a tramway for the can-bodies, combined with the wheel W, having at the end of its spokes the rim *a*, the rim *b*, and the bars *d*, connecting said rims and forming spaces to receive the can-bodies over said tramway, substantially as set forth.

2. The acid and solder receptacles L M in the outline of the arc of a circle, combined with the segmental bars O P, secured by angle-plates Q, having elongated slots S to receive the bolts securing said bars, combined with the wheel W, having rims connected by bars, forming spaces to receive the can-bodies, and adapted to move them through the acid and solder baths, substantially as set forth.

Signed at New York, in the county of New York and State of New York, this 3d day of January, A. D. 1889.

WILLIAM HIPPERLING.

Witnesses:
　CHAS. C. GILL,
　W. A. C. MATTHIE.